(12) United States Patent
Nguyen et al.

(10) Patent No.: US 8,600,881 B2
(45) Date of Patent: Dec. 3, 2013

(54) SYSTEM AND METHOD FOR UNIQUELY IDENTIFYING POINT OF SALE DEVICES IN AN OPEN PAYMENT NETWORK

(75) Inventors: Loc Duc Nguyen, Berkeley, CA (US); Chris S. Nelson, Foster City, CA (US); Charles Quach, Pacifica, CA (US)

(73) Assignee: Visa International Service Association, San Francisco, CA (US)

( * ) Notice: Subject to any disclaimer, the term of this patent is extended or adjusted under 35 U.S.C. 154(b) by 441 days.

(21) Appl. No.: 12/474,186

(22) Filed: May 28, 2009

(65) Prior Publication Data

US 2010/0121701 A1    May 13, 2010

Related U.S. Application Data

(60) Provisional application No. 61/114,356, filed on Nov. 13, 2008.

(51) Int. Cl.

| | | |
|---|---|---|
| G01G 23/18 | (2006.01) | |
| G06M 1/06 | (2006.01) | |
| G07G 1/00 | (2006.01) | |
| G06F 17/00 | (2006.01) | |
| G06Q 30/00 | (2012.01) | |
| G06Q 40/00 | (2012.01) | |

(52) U.S. Cl.
USPC .............. 705/39; 235/1 R; 235/7 R; 235/375; 705/14.26; 705/14.38; 705/35; 705/40

(58) Field of Classification Search
None
See application file for complete search history.

(56) References Cited

U.S. PATENT DOCUMENTS

| | | | | |
|---|---|---|---|---|
| 4,771,461 | A * | 9/1988 | Matyas | 380/282 |
| 6,145,738 | A * | 11/2000 | Stinson et al. | 235/379 |
| 2002/0138430 | A1 | 9/2002 | Wagner | |
| 2003/0154138 | A1* | 8/2003 | Phillips et al. | 705/26 |
| 2004/0220964 | A1 | 11/2004 | Shiftan et al. | |
| 2007/0055574 | A1 | 3/2007 | Jensen et al. | |
| 2007/0073617 | A1* | 3/2007 | Tolbert et al. | 705/39 |
| 2007/0187492 | A1* | 8/2007 | Graves et al. | 235/380 |

(Continued)

FOREIGN PATENT DOCUMENTS

| | | |
|---|---|---|
| KR | 10-2001-0037034 | 5/2001 |
| KR | 10-2007-0078632 | 8/2007 |

OTHER PUBLICATIONS (IBM Corporation, "IBM SurePOS 700 Series", Oct. 2007).*

(Continued)

*Primary Examiner* — Ryan Zeender
*Assistant Examiner* — Allen Chein
(74) *Attorney, Agent, or Firm* — Kilpatrick Townsend & Stockton LLP

(57) ABSTRACT

A system, apparatus, and method for using a point of sale (POS) terminal as part of an electronic payment transaction. A unique number, code, alphanumeric character string, or other form of identification is assigned to each terminal manufacturer. Each terminal manufacturer then assigns a unique global identifier to each terminal they manufacture. The identifier assigned by the manufacturer may incorporate or be derived from the unique identifier assigned to each manufacturer. In the course of an electronic payment, other form of transaction, or other function or operation of the terminal, the POS terminal's unique global identifier is provided to a payment processor or other electronic payment network entity. This information, alone or in combination with portable consumer device data and transaction data, may be used to provide new services, content, and products to consumers or merchants.

18 Claims, 7 Drawing Sheets

(56) References Cited

U.S. PATENT DOCUMENTS

| | | |
|---|---|---|
| 2008/0052349 A1* | 2/2008 | Lin .............................. 709/203 |
| 2008/0065490 A1* | 3/2008 | Novick et al. ................... 705/14 |
| 2009/0292606 A1* | 11/2009 | Baron et al. ............... 705/14.37 |

OTHER PUBLICATIONS (Gabriel Torres and Cássio Lima, "How to Discover Your Network Card Real Manufacturer", Jan. 16, 2007, http://www.hardwaresecrets.com/article/How-to-Discover-Your-Network-Card-Real-Manufacturer/414/2; hereinafter "Torres").*

Stephen Gandy, "Who made that Vivitar Lens?", Nov. 26, 2003, available at http://www.cameraquest.com/VivLensManuf.htm.*

Joseph Moran, "Understanding and Resolving IP Address Conflicts", Jun. 29, 2007, available at http://web.archive.org/web/20070808160919/http://www.webopedia.com/DidYouKnow/Internet/2007/IP_Address_Conflicts.asp.*

International Search Report and Written Opinion mailed Jun. 24, 2010 in PCT Application No. PCT/US2009/064329, filed Nov. 13, 2009 (11 pages).

* cited by examiner

300

SYSTEM AND METHOD FOR UNIQUELY IDENTIFYING POINT OF SALE DEVICES IN AN OPEN PAYMENT NETWORK

CROSS-REFERENCE TO RELATED APPLICATION

This application claims priority from U.S. Provisional Patent Application No. 61/114,356, filed Nov. 13, 2008, and entitled "System and Method For Uniquely Identifying Point of Sale Devices in an Open Network," the contents of which are hereby incorporated in its entirety by reference.

BACKGROUND

Embodiments of the present invention are directed to systems, apparatuses and methods for the purchase of products or services using financial instruments such as debit cards or credit cards, and more specifically, to a method of assigning a unique identifier within an open network to the point of sale terminals used in transactions involving such instruments. The inventive method and associated systems and apparatuses may be used to facilitate the transactions and enhance the processing of data associated with the transactions to provide better service to users of the financial instruments and the associated data processing networks.

Financial instruments or payment devices such as debit cards or credit cards are used by millions of people worldwide to facilitate various types of commercial transactions. In a typical transaction involving the purchase of a product or service, the instrument is presented at a point of sale device or terminal ("POS terminal") located at a merchant's place of business. The POS terminal may be a card reader or similar device that is capable of reading or accessing data stored on the financial instrument, where this data may include identification or authentication data, for example.

Debit cards, credit cards and other portable consumer devices are typically associated with a unique identification number. The identification number is "unique" in the sense that each such number is associated with only a single financial instrument within a given network of instruments and financial data processors. Further, a network may be either "open" or "closed". A closed network (sometimes termed a "proprietary network") is one that is typically operated by one or more entities but excludes participation or access by entities that are not members of the network. In contrast, an open network is one in which participation is not limited in this manner, and in which entities that may be members of other, proprietary networks may participate. Identification and other data may be unique within a closed network but not within an open network (as the same identification or number may be assigned to objects within two different closed networks). In this sense, an object within a closed network may not have a globally unique identifier within an open network, even though the identifier is unique within the closed network.

In some cases the unique identification number associated with a debit card, credit card or other portable consumer device is termed a primary account number (PAN) and is part of the bank identification number (BIN) schema adopted by card issuing entities (e.g., Visa™ or MasterCard™). The PAN is globally unique within the group of all financial data processing networks, even though those networks may be closed networks. The PAN is one of the pieces of data read from the card by the POS terminal and provided to a payment processor or transaction processing entity. The global use of a standardized numbering system permits a unique identification number to be associated with each issued card or financial instrument. This has the benefit of enabling system wide tracking of card usage and account activity, providing the ability to detect fraud or other undesirable activities on the part of card users or merchants in an efficient and unambiguous manner.

However, there are problems that may arise even within the present consumer device identification system. One problem is that the advent and widespread usage of prepaid-type cards, such as gift and rebate cards, has introduced ambiguity and uncertainty into the system. This is because although each prepaid card carries a globally unique PAN, gift and rebate cards are not associated with an identifiable account holder and therefore payment systems cannot assign financial accountability to a unique individual. In addition, in contrast to the globally unique identification number associated with a portable consumer device, (which, as noted, can create problems for some types of prepaid cards), there is presently no globally unique number or form of identification assigned to (or otherwise associated with) the POS terminals. While a POS terminal may be associated with an identification number that is unique within a closed network (such as a local environment, store, group of stores, or commonly owned set of terminals), at present there is no method of generating, assigning, or using a globally unique identifier for a POS terminal where that identifier is unique within an open network. Further, because POS terminals are not presently associated with such a unique identifier within an open network, the unique POS identification data is not provided to a payment processor or transaction processing entity as part of a transaction or other operation performed by the POS terminal. This situation is undesirable for several reasons. Firstly, it creates a possible security risk because transactions occurring at the POS terminal cannot be verified as accurately in the absence of unique identification or registration data for the device. This may create the opportunity for fraudulent activities, such as a situation in which "spoofed" or fake POS terminals are used to obtain electronic payments from consumers.

In addition, within an open network, the lack of a way to unambiguously associate transactions with the POS terminal at which the transactions occurred prevents a payment processor from collecting data about the types and volume of transactions occurring at specific POS terminals. This is disadvantageous because such data may be of benefit in configuring POS terminals for specific data processing or content delivery tasks (such as downloading data processing or acquisition applications to a specific type of POS terminal, or providing content for the benefit of a user of the terminal). Another disadvantage of the lack of a unique POS terminal identification is that it prevents a centralized entity from having knowledge of the capabilities of the POS terminals, and hence prevents or delays the introduction of new features or functions that may provide added security or other benefits to the consumer. As noted, although some POS terminal manufacturers may assign or otherwise associate a serial or other identification number with the devices they manufacture, this information may not be provided to a payment processor, and further, even if it were provided, it may not be unique across multiple manufacturers.

What is desired is a system, apparatus and method for uniquely identifying POS terminals that are part of an open payment processing network, and further, a method of using that information as part of a transaction or other process to overcome the disadvantages that arise from the lack of such identification data. Embodiments of the invention address these problems and other problems individually and collectively.

SUMMARY

Embodiments of the present invention are directed to a system, apparatus, and method for conducting an electronic payment transaction. The transaction includes use of a point of sale (POS) terminal, with the terminal being associated with a unique global identifier. The unique identifier is associated with a single POS terminal that operates within a global or open network of financial instrument issuers and users, and financial data processors. The unique global terminal identifier is based on, generated from, or otherwise derived from a unique manufacturer identifier assigned to the manufacturer of the terminal. The unique global terminal identifier may be a string or set of alphanumeric characters, for example. The unique global terminal identifier is transferred to an element of a payment processing network. The transfer may be in response to the occurrence of an electronic payment transaction at the terminal, or in response to the occurrence of an event or operation performed by or at the terminal (such as terminal initialization or receipt of a command from a consumer, merchant or element of the payment processing network).

In one embodiment, the present invention is directed to a method of performing an electronic payment transaction for a consumer, where the method includes receiving data identifying the consumers payment device collected at a point of sale terminal, receiving data identifying the point of sale terminal, wherein the data identifying the point of sale terminal uniquely identifies the terminal within an open network and processing the received data to determine data to provide to the point of sale terminal, wherein the provided data is determined in response to the received data.

In another embodiment, the present invention is directed to a point of sale terminal for use in an electronic payment transaction, where the terminal includes a portable consumer device interface to receive portable consumer device data, a data transfer interface configured to transfer data to an element of a payment processing network, and a data storage element storing point of sale terminal identifier data, wherein the identifier data is unique within an open network, and wherein the point of sale terminal is configured to transfer the identifier data to the element of the payment processing network via the data transfer interface.

In yet another embodiment, the present invention is directed to a method of conducting an electronic payment transaction, where the method includes receiving data identifying a consumer's payment device at a point of sale terminal, accessing data identifying the point of sale terminal, wherein the data identifying the point of sale terminal uniquely identifies the terminal within an open network, transferring the data identifying the consumer's payment device and the data identifying the point of sale terminal to an element of a payment processing network, and processing the transferred data to determine data to provide to the point of sale terminal, wherein the provided data is determined in response to the received data.

In yet another embodiment, the present invention is directed to a method of facilitating an electronic payment transaction, where the method includes generating a unique identifier for a manufacturer of point of sale terminals, communicating the unique identifier to the manufacturer of the point of sale terminals, generating a unique terminal identifier for each point of sale terminal manufactured by the manufacturer, the unique terminal identifier being generated in response to the manufacturer's unique identifier and uniquely identifying the terminal within an open network, and associating the unique terminal identifier with its respective terminal.

In yet another embodiment, the present invention is directed to a method of uniquely identifying a point of sale terminal used in an electronic payment transaction within an open network, where the method includes receiving a unique identifier assigned to a manufacturer of point of sale terminals, generating a unique terminal identifier for each point of sale terminal manufactured by the manufacturer, the unique terminal identifier being generated in response to the unique identifier assigned to the manufacturer and uniquely identifying the terminal within the open network, and associating the unique terminal identifier with its respective terminal.

In yet another embodiment, the present invention is directed to a method of replacing an identifier assigned to a point of sale terminal, where the method includes receiving a request to generate a unique terminal identifier for a point of sale terminal used in an open network, in response to the request, initiating a process to generate the unique terminal identifier, receiving a unique identifier assigned to a manufacturer of point of sale terminals, generating the unique terminal identifier for the point of sale terminal, the unique terminal identifier being generated in response to the unique identifier assigned to the manufacturer and uniquely identifying the terminal within the open network, and associating the unique terminal identifier with its respective terminal.

Other objects and advantages of the present invention will be apparent to one of ordinary skill in the art upon review of the detailed description of the present invention and the included figures.

DETAILED DESCRIPTION

Figure 1:
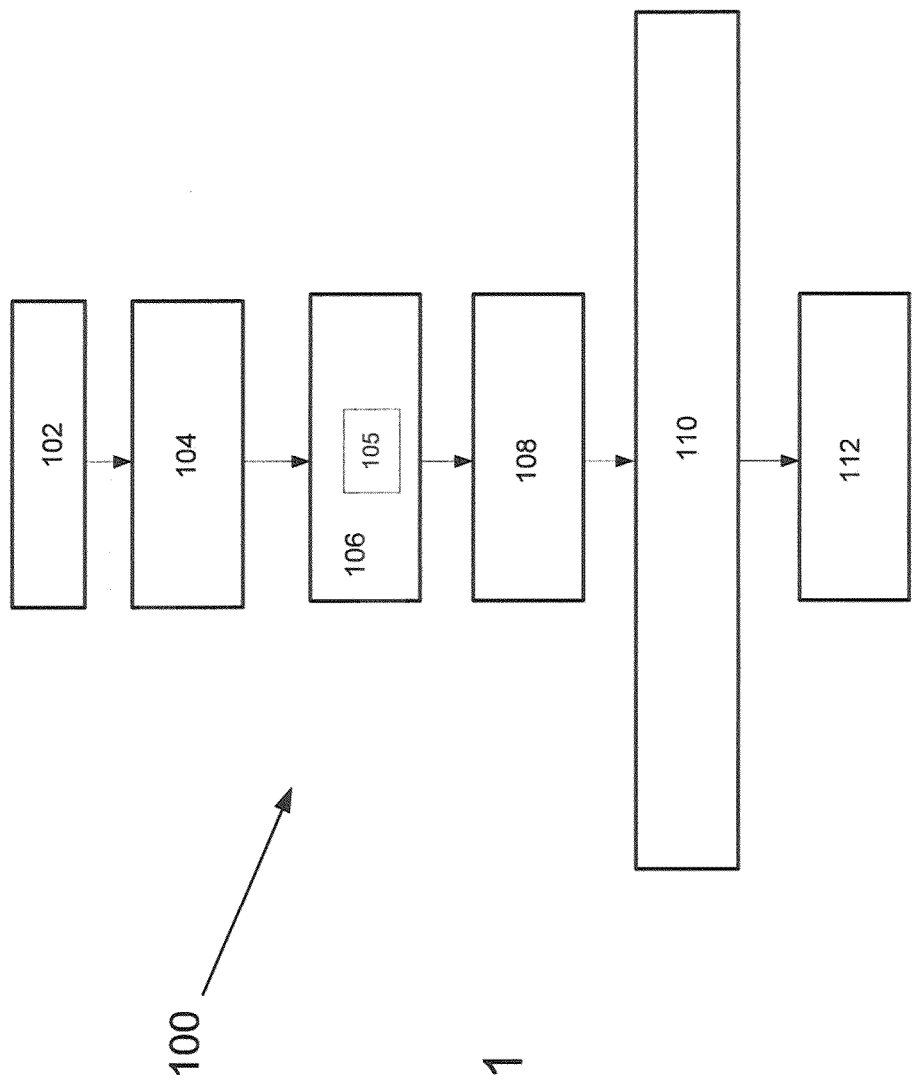
FIG. 1 is a functional block diagram illustrating the primary functional elements of a payment system that utilizes a portable consumer device.

Before proceeding to describe one or more embodiments of the present invention, and to assist with providing a better understanding of the invention, it may be useful to define some terms that will be used in describing the inventive system and method. In the context of the present invention:

A "closed network" is a network or group of networks to which only members may have access. Such a network may be termed a proprietary network. Data within the network is generally available only to members, and some such data is typically not unique within a broader environment (such as an open network or all possible networks).

An "open network" is a network or group of networks that are accessible by any entity having a means to communicate with the network. Data within the network is generally available to any such entity.

A "globally unique identifier", "unique global identifier" or "globally unique identifier within an open network" is data used to identify a POS terminal, where that data is unique within an open network. This means that the identifier is associated with a single POS terminal operating within the open network. Another way of describing this concept is that there is a one-to-one correspondence between each identifier and each POS terminal.

Embodiments of the present invention are directed to a system, apparatus, and method for using a point of sale (POS) terminal as part of an electronic payment transaction. A globally unique number, code, alphanumeric character string, or other form of identification is assigned to each POS device or terminal manufacturer. This identifier may be generated in accordance with a numbering schema administered by a payment processor or other payment network entity. The identifier assigned to each manufacturer is unique within an open network, i.e., there is a one-to-one correspondence between each identifier and each POS terminal manufacturer operating within the open network. Each terminal manufacturer then generates and assigns a unique identifier to each device or terminal they manufacture. The identifier assigned by the manufacturer may incorporate or be derived from the unique identifier assigned to each manufacturer (e.g., a concatenation of the unique manufacturer identifier and an alphanumeric character string representing a serial number for the POS terminal). Further, the combination of the identifier assigned to the manufacturer and the POS terminal identifier generated by that manufacturer, or the POS terminal identifier alone (if, for example, it is a concatenation of the two identifiers) forms an identifier that is unique within an open network. In the course of an electronic payment, other form of transaction, or other function or operation of the POS terminal, the POS terminal's unique global identifier is provided to a payment processor or other electronic payment network entity. This information, alone or in combination with portable consumer device data and transaction data, may be used to provide new services, content, and products to consumers or merchants.

Prior to describing one or more embodiments of the invention in greater detail, a brief discussion of the entities involved in an electronic payment transaction and their roles in the payment process will be presented with regards to FIG. 1, which is a functional block diagram illustrating the primary functional elements of a payment system 100 that utilizes a portable consumer device. As shown in FIG. 1, a consumer 102 desires to engage in a purchase of a good or service, with payment made using a portable consumer device 104. Portable consumer device 104 may take the form of a card having a magnetic strip encoded with account data or other relevant data (such as a standard credit or debit card), or other suitable form of data storage device (such as a smart card, mobile phone, PDA, or transportable memory device). Portable consumer device 104 may be presented to a Merchant 106 at a point of sale (POS) or indirectly via a scanning or other data acquisition device, or by providing identification information over a network connection. Merchant 106 typically uses a POS terminal 105 to obtain data from portable consumer device 104 and processes the transaction using account data obtained directly or indirectly from portable consumer device 104. If necessary, this data may be used in conjunction with additional consumer data (such as identification data, authorization data, or security data) in order to complete the transaction. Typically, an electronic payment transaction is authorized if the consumer conducting the transaction is properly authenticated and has sufficient funds or credit to conduct the transaction. Conversely, if there are insufficient funds or credit in the consumer's account, or if the consumer's portable consumer device is on a negative list (e.g., it is indicated as possibly stolen), then an electronic payment transaction may not be authorized.

In standard operation, an authorization request message is, created during or after a consumer purchase of a good or service at a point of sale (POS) using portable consumer device 104. Note that in addition to a credit or debit card, in some embodiments, portable consumer device 104 may be a smart card, wireless phone, PDA, laptop computer, or transportable data storage device (such as flash memory) in which account data, user identification, authorization data, or other relevant data may be stored. The authorization request message may be sent from POS terminal 105 located at a merchant place of business 106 to the merchant's Acquirer 108, to a Payment Processing Network 110, and then to an Issuer 112. An "authorization request message" can include a request for authorization to conduct an electronic payment transaction. It may include one or more of an account holder's payment account number, currency code, sale amount, merchant transaction stamp, acceptor city, acceptor state/country, etc. An authorization request message may be protected using a secure encryption method (e.g., 128-bit SSL or equivalent) in order to prevent data from being compromised.

As mentioned, the transaction related data is provided by Merchant 106 to Acquirer 108, which in most situations is a bank, financial institution, credit union or other institution responsible for some or all of the account management and/or account data processing of Merchant's financial transactions. Acquirer 108 provides some or all of the transaction related data to Payment Processing Network 110, which may be a transaction clearance system or similar entity. After processing of the transaction, Payment Processing Network 110 may provide some or all of the transaction and related data to Issuer 112, where Issuer 112 may take the form of a bank, financial institution or other business entity that issued portable consumer device 104 and provided device 104 to consumer 102.

As mentioned, portable consumer device 104 may take one of several suitable forms. Portable consumer device 104 can be hand-held and compact so that it can fit into a consumer's wallet and/or pocket (e.g., pocket-sized). Such devices may include smart cards, ordinary credit or debit cards (with a magnetic strip and without a microprocessor), keychain devices (such as the Speedpass™ commercially available from Exxon-Mobil Corp.), etc. Other examples of portable consumer devices 104 suitable for use with embodiments of the present invention include cellular phones, personal digital assistants (PDAs), pagers, payment cards, security cards, access cards, smart media, transponders, and the like. Portable consumer device 104 may incorporate the ability to perform debit functions (e.g., a debit card), credit functions (e.g., a credit card), or stored value functions (e.g., a pre-paid or stored value card).

In the example of the portable consumer device being a mobile device, the device may include a contactless element such as a chip for storing payment data (e.g., a BIN number, account number, etc.) and a wireless data transfer (e.g., transmission) element such as an antenna, a light emitting diode, or a laser, etc. The device containing the chip or other data storage element may be a cellular phone, personal digital assistant (PDA), pager, transponder, or the like.

Figure 5A:
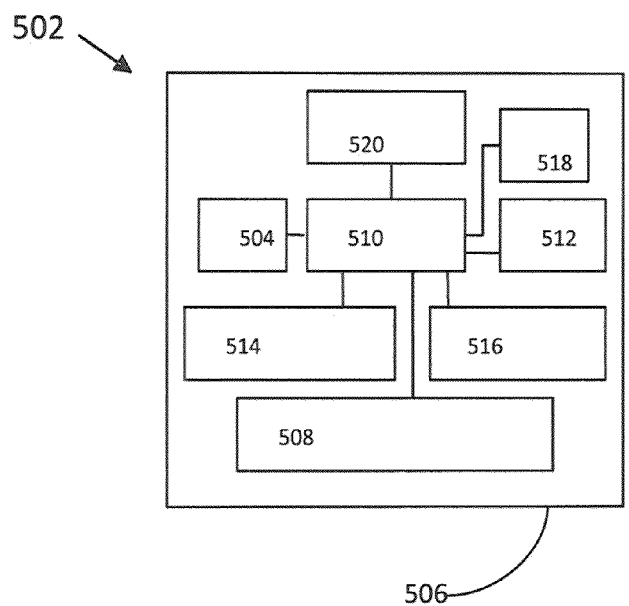
FIG. 5(a) is a block diagram of elements that may be present in a portable consumer device that may be used with some embodiments of the present invention.

An exemplary portable consumer device 104 in the form of a mobile phone 502 may comprise a computer readable medium 504 and a body 506 as shown in FIG. 5(a), which is a block diagram of elements that may be present in a portable consumer device 104 that may be used with embodiments of the present invention. Note that FIG. 5(a) shows a number of components, and the portable consumer devices according to embodiments of the invention may comprise any suitable combination or subset of such components. The computer readable medium 504 may be present within the body 506, or may be detachable from it. The body 506 may be in the form a plastic substrate, housing, or other structure. The computer readable medium 504 may be a memory that stores data and may be in any suitable form including a magnetic stripe, a memory chip, uniquely derived keys, encryption algorithms, etc. The memory also preferably stores information such as financial information, and may include transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc. Subject to security or authorization restrictions, any of this information may be transmitted by the portable consumer device 502.

Portable consumer device 502 may further include a contactless element 508, which is typically implemented in the form of a semiconductor chip (or other data storage element) with an associated wireless transfer (e.g., data transmission) element, such as an antenna. Contactless element 508 is associated with (e.g., embedded within) portable consumer device 502 and data or control instructions transmitted via a cellular network may be applied to contactless element 508 by means of a contactless element interface (not shown). The contactless element interface functions to permit the exchange of data and/or control instructions between the mobile device circuitry (and hence the cellular network) and an optional contactless element 508.

Contactless element 508 is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the portable consumer device 502 and another device. Thus, portable consumer device 502 may be capable of communicating and transferring data and/or control instructions via both cellular network and near field communications capability.

Portable consumer device 502 may also include a processor 510 (e.g., a microprocessor) for processing instructions to implement the functions of the portable consumer device 502 and a display 512 to allow a consumer to see phone numbers and other information and messages. Portable consumer device 502 may further include input elements 514 to allow a consumer to input information into the device, a speaker 516 to allow the consumer to hear voice communication, music, etc., and a microphone 518 to allow the consumer to transmit voice through portable consumer device 502. Portable consumer device 502 may also include an antenna 520 for wireless data transfer (e.g., data transmission). If the portable consumer device is in the form of a debit, credit, or smartcard, the portable consumer device may also optionally have features such as a magnetic strip. Such devices can operate in either a contact or contactless mode.

Figure 5B:
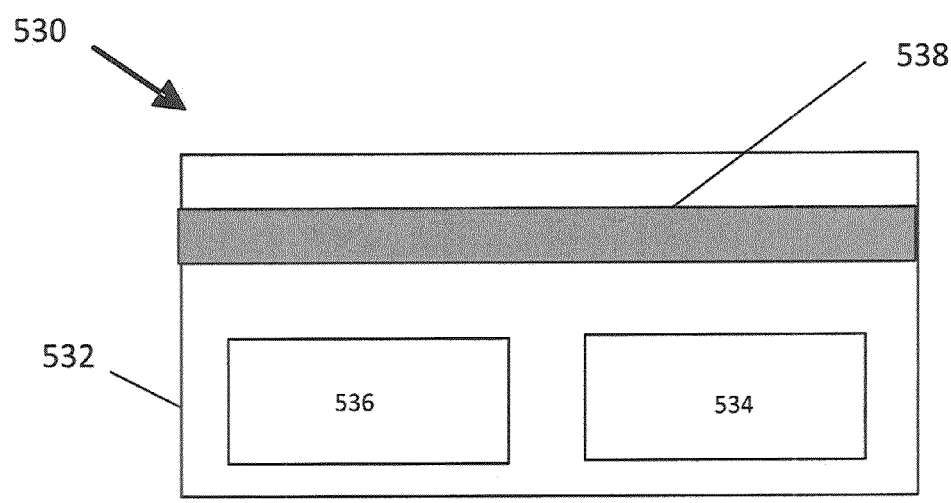
FIG. 5(b) shows an example of a portable consumer device in the form of a card that may be used with some embodiments of the present invention.

An example of a portable consumer device 530 in the form of a card is shown in FIG. 5(b). FIG. 5(b) shows a plastic substrate 532 that provides the form factor for device 530. A contactless element 534 for interfacing with a data access or data transfer device may be present on or embedded within the plastic substrate 532. Consumer information 536 such as an account number, expiration date, and consumer name may be printed or embossed on the card. Also, a magnetic stripe 538 may also be on the plastic substrate 532.

As shown in FIG. 5(b), portable consumer device 530 may include both a magnetic stripe 538 and a contactless element 534. In some embodiments, both the magnetic stripe 538 and the contactless element 534 may be in the portable consumer device 530. In other embodiments, either the magnetic stripe 538 or the contactless element 534) may be present in the portable consumer device 530.

Returning to FIG. 1, Payment Processing Network 110 may include data processing subsystems, networks, and other means of implementing operations used to support and deliver authorization services, exception file services, and clearing and settlement services for payment transactions. An exemplary Payment Processing Network may include VisaNet™. Payment Processing Networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

Payment Processing Network 110 may include a server computer. A server computer is typically a powerful computer or cluster of computers. For example, the server computer can be a large mainframe, a minicomputer cluster, or a group of servers functioning as a unit. In one example, the server computer may be a database server coupled to a web server. Payment Processing Network 110 may use any suitable wired or wireless network, including the Internet to permit communication and data transfer between network elements. Among other functions, Payment Processing Network 110 may be responsible for ensuring that a user is authorized to conduct the transaction (via an authentication process), confirm the identity of a party to a transaction (via receipt of a personal identification number), confirm a sufficient balance or credit line to permit a purchase, and reconcile the amount of purchase with the user's account (via entering a record of the transaction amount, date, etc.).

As mentioned, Merchant 106 may be associated with a physical location and will typically have a physical point of sale (POS) terminal 105 that can interact with portable consumer device 104. Merchant 106 may also (or instead) be associated with a virtual location (such a web-site) and have a virtual POS terminal or user interface via which data may be entered by a user as part of a transaction. For a physical POS terminal, any suitable point of sale terminal may be used, including device (e.g., card) readers. The device readers may utilize any suitable contact or contactless mode of operation. For example, exemplary card readers can include RF (radio frequency) antennas, magnetic stripe readers, etc., to enable interaction with portable consumer device 104.

As mentioned, at present, POS terminals are not assigned or associated with a globally unique identifier within an open network, such as an identification number or character string. This prevents a payment processor or other interested party from being able to effectively track POS terminal activity or have knowledge of POS terminal capabilities. This may prevent authentication of the POS terminal, provision of software upgrades to POS terminals to enable those terminals to provide new services or functions to consumers, and tracking of usage patterns (such as differential use of certain POS terminals by consumers, which may enable provision of targeted services or content to users of those terminals).

In order to overcome these disadvantages, and provide new products, services and functions to consumers and merchants, embodiments of the present invention are directed to establishing a system or schema for assigning a unique global identifier to each POS terminal that is used as part of a payment network, or among multiple networks. Embodiments of the present invention are further directed to providing the globally unique POS terminal identifier to a payment processing entity as part of a transaction or other operation performed by the POS terminal, and using that data to provide new services and functions to consumers and merchants. In some embodiments, the inventive system may be implemented as follows:

- Payment Processor or Other Entity Assigns a Unique Manufacturer Identification Number (MIN) to Each POS Terminal Manufacturer;
- Each POS Terminal Manufacturer Generates or Assigns a Unique POS Terminal Number (PDN) to Each Terminal They Manufacture;
- The POS Terminals are Delivered to Acquirers or Merchants for Deployment at Retail Locations; and
- During the Course of a Transaction or Other POS Device Operation, the Acquirers or Merchants Transfer the MIN and PDN Data (or other form of unique global identifier) to the Payment Processor or Other Data Processing Entity.

Figure 2:
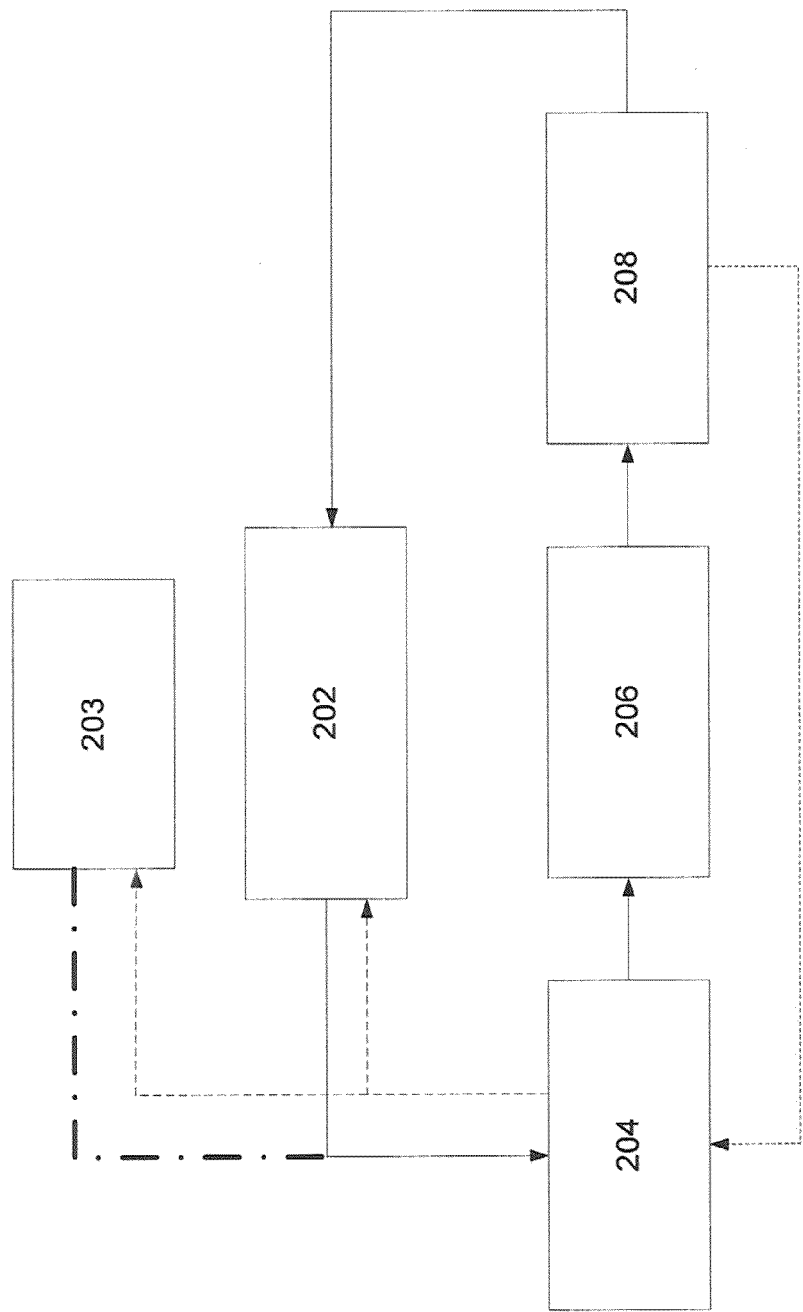
FIG. 2 is a diagram illustrating the flow of point of sale (POS) terminal identification data between certain of the entities involved in a payment transaction, in accordance with some embodiments of the present invention.

FIG. 2 is a diagram illustrating the flow of point of sale (POS) terminal identification data between certain of the entities involved in a payment transaction, in accordance with some embodiments of the present invention. As shown in the figure, a payment processor 202 or other entity (depicted in the figure as element 203) generates or assigns a unique manufacturer identifier, such as an identification number or character string (in some embodiments termed a "MIN"—manufacturer identification number) for each POS terminal manufacturer 204. The MIN may be a number, string of numbers or combination of alphanumeric characters, for example. Payment processor 202 or other entity 203 will typically maintain a record or data file that contains a listing of the POS terminal manufacturers and the associated MIN for each such manufacturer.

The unique manufacturer identification number (MIN) is then provided by the payment processor 202 or other entity 203 to the associated terminal manufacturer 204 (as indicated in the figure by the path from element 203 to element 204, or the path from element 202 to element 204). Using the MIN schema or other agreed upon set of rules, each POS terminal manufacturer 204 then creates a unique POS Device Number (PDN) for each POS terminal they produce. The PDN for each POS terminal is a unique global identification number or character string (typically composed of, but not limited to, alphanumeric characters) for a terminal or device manufactured by a manufacturer having a specified MIN. Note that the PDN may include a reference to the MIN, be formed from a concatenation of the MIN and another serial number, or otherwise incorporate the MIN of the manufacturer (e.g., PDN=MINXXXX, where XXXX represents alphanumeric characters), or that data may be provided with the PDN when such data is provided to a payment processor or other data processing entity. The PDN (and if desired, the MIN) may be displayed on the POS terminal, stored in memory in the POS terminal 206, or otherwise be associated with the terminal. The POS terminals are then provided to various merchants or acquirers for deployment in the field at retail locations. The PDN (and if desired, the MIN) are provided to the acquirer or merchant transaction data processing systems 208 during a transaction initiated by a consumer. The PDN (and if desired, the MIN) may also be provided to the acquirer or merchant transaction data processing systems 208 as part of another operation or function performed by the POS terminal (such as at start up, reboot, maintenance, software update, in response to a request from the payment processor, etc.). The PDN/MIN data is then provided to the payment processor 202, either as part of the transaction data (such as the payment device identification number) that the payment processor receives for a transaction, or as the result of another operation performed by the POS terminal.

As mentioned, while the PDN/MIN data may be provided to a payment processor as part of a transaction, in some embodiments, the PDN/MIN data may be provided to a payment processor as part of a boot up, initialization process, or other process or function executed by the POS terminal. This boot up, initialization, or other process or function may occur at start up of the terminal, during a maintenance cycle, during a programming process, upon receiving a request or instruction from a payment processor, or as part of another suitable process directed to obtaining identification or authentication data from the POS terminal.

Further, although in some embodiments the data provided by the POS terminal to a payment processing entity is the PDN/MIN data, in some embodiments the POS terminal may also provide some or all of the following data, either at initialization, in conjunction with a transaction, in response to a request from the payment processing entity, or as part of another suitable process:

- Terminal make/model;
- Terminal firmware version;
- Terminal owner data;
- Terminal location data;
- Number of transactions processed by terminal;
- Hours of operation (elapsed "run" time); and
- In-service date, etc.

The POS terminal data provided to a payment processor or other entity as part of device start up, initialization, maintenance, in response to a request from the payment processor, as part of a transaction, or as part of another suitable process or function may be used to improve the existing services provided to a consumer or to provide new services. The POS terminal data may be used alone, or in combination with other relevant data, to provide services that include, but are not limited to:

- Device registration and initial setup (e.g., registration with a payment processing network and set up in response to instructions or data provided by that system);
- Device validation for security or fraud prevention purposes (authentication, verification or other security process conducted in part or in whole by a payment processing network or other network element);
- Ongoing software maintenance and upgrades to provide new or improved services and functions (e.g. after authentication, download of updates or applications to enhance services provided by POS terminal);

Device tracking and mapping to determine device location (e.g., in combination with location data obtained from POS terminal or other source);

Collection of data relevant to usage of the device (e.g., transaction data as function of POS terminal), processing that data, and providing the processed data to merchants;

Terminal identification for purposes of routing messages, transaction confirmations, service or function activation instructions, promotional content, or other data to a specific POS terminal at which a transaction is occurring (e.g., in response to some characteristic of the transaction, the consumer, the merchant, etc.); and Providing differentiated services, terminal configurations, functions, features or products to POS terminals based on the terminal location, usage patterns, device hardware or device software characteristics, among other characteristics.

As an example, the POS terminal identifier may be used alone or in conjunction with other data to determine the physical location of the terminal (and hence presumably the consumer). The consumer identification data obtained from the portable consumer device (e.g., a credit card) may be used to access the consumer's account data that is managed by a financial services data processing entity. The account data, in conjunction with the POS terminal location may be used to generate a promotional offering based on the consumer's usage patterns, rewards club memberships, present location relative to another store or event, or other personal or account data available to the data processing entity. The generated offering or other content may then be presented to the intended consumer at the POS terminal during or at the conclusion of the transaction.

Note that in another embodiment of the invention, a previously assigned identifier for a point of sale terminal may be replaced by a new, unique point of sale terminal identifier that is generated in accordance with a method or process based on the data flow depicted in FIG. 2. For example, in one embodiment, transaction data processing system 208 may initiate a request or issue a command to point of sale terminal manufacturer 204 (as indicated by the path from element 208 to element 204), with the request or command causing point of sale terminal manufacturer 204 to issue a request to either payment processor 202 or entity 203. The request from manufacturer 204 to payment processor 202 or to entity 203 (as indicated by the path from element 204 to element 202 or to element 203) causes the recipient of the request to generate a unique point of sale terminal manufacturer identifier (previously referred to as the MIN), followed by the other data generation or data flow stages described previously with reference to FIG. 2.

Figure 3:
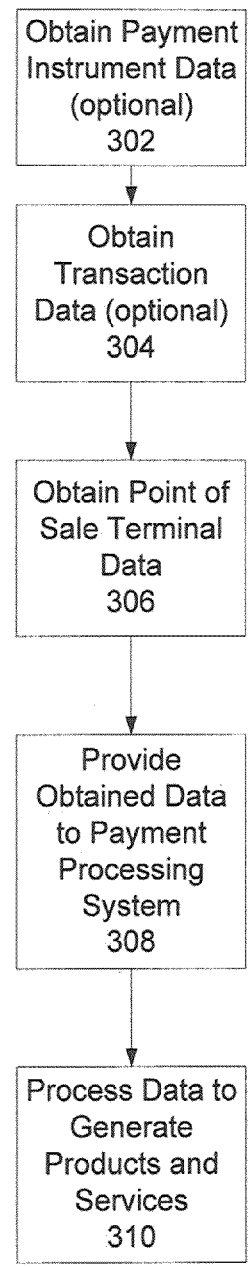
FIG. 3 is a flowchart illustrating a first method for collecting and processing data, including terminal identification data, at a point of sale terminal, in accordance with some embodiments of the present invention.

FIG. 3 is a flowchart illustrating a first method 300 for collecting and processing data, including terminal identification data, at a point of sale terminal, in accordance with some embodiments of the present invention. As shown in the figure, in some embodiments, the method may start by obtaining data from a consumer's portable consumer device (stage 302) at the POS terminal. Note that this step is optional, as the POS terminal data may be obtained outside the course of a payment transaction (as will be described in greater detail with reference to FIG. 4). Next, at stage 304, transaction data is obtained. As with stage 302, this step is optional in the situation where the POS terminal data is obtained in the absence of a payment transaction. At stage 306, the POS terminal identification data is obtained; this data may be read from a data storage element or memory in the POS terminal, keyed in by an operator, or obtained in another suitable manner. As discussed, the POS terminal data may include, but is not limited to, a unique global identifier, device model or make data, device location data, device usage data, etc. Next, at stage 308, the data obtained (e.g., portable consumer device, transaction, or POS terminal data) is provided to the payment processing network or other data processing entity, either via the merchant or acquirer systems, or via another network element. The provided data is processed by the payment processing network or another data processing entity to provide services and products to consumers, merchants, or other members of the payment processing network (stage 310). Examples of such services or products include, but are not limited to, those previously described (e.g., services (financial, commercial, etc.) or content (such as promotional offers, coupons, tickets, advertisements) specific to a consumer, POS terminal location, merchant, etc.).

Figure 4:
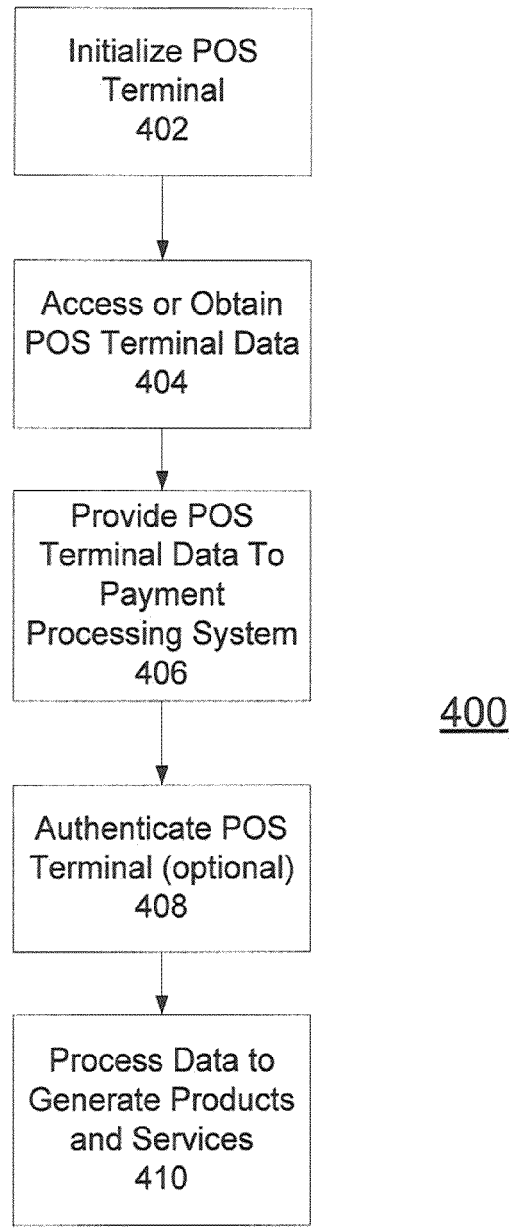
FIG. 4 is a flowchart illustrating a second method for collecting and processing data, including terminal identification data, at a point of sale terminal, in accordance with some embodiments of the present invention.

FIG. 4 is a flowchart illustrating a second method 400 for collecting and processing data, including terminal identification data, at a point of sale terminal, in accordance with some embodiments of the present invention. As shown in the figure, in some embodiments, the POS terminal data may be provided to a payment processor or other element of a payment processing network as a result of an initialization process or function (stage 402). In this regard, "initialization process or function" includes, but is not limited to, a process or function occurring at start up of the terminal, at reboot of the terminal, at some predetermined event or time during operation of the terminal, in response to a command or instruction from an operator or user of the terminal, in response to a command or instruction from a payment processor or other element of a payment processing network, or other suitable operation or function. In general, the initialization process or function is an operation that initiates the process of accessing the POS terminal identifier data and transferring that data to an element of the payment processing network.

Next, at stage 404, the POS terminal data is obtained or otherwise accessed by the terminal. The data may be read from a data storage element or memory in the POS terminal, keyed in by an operator, or obtained in another suitable manner. As discussed, the POS terminal data may include, but is not limited to, a unique global identifier, device model or make data, device location data, device usage data, etc. Next, at stage 406, the data obtained is provided to the payment processing network or other data processing entity, either via the merchant or acquirer systems, or via another network element. In some embodiments, the data provided may be used to authenticate or otherwise validate the POS terminal (stage 408). The authentication or validation may be performed by comparing the received data to an index or list of authenticated devices. Further, the provided data may be processed by the payment processing network or another data processing entity to provide services and products to consumers, merchants, or other members of the payment processing network (stage 410). Examples of such services or products include, but are not limited to, those previously described (e.g., services (financial, commercial, etc.) or content (such as promotional offers, coupons, tickets, advertisements) specific to a consumer, POS terminal location, merchant, etc.).

Figure 6:
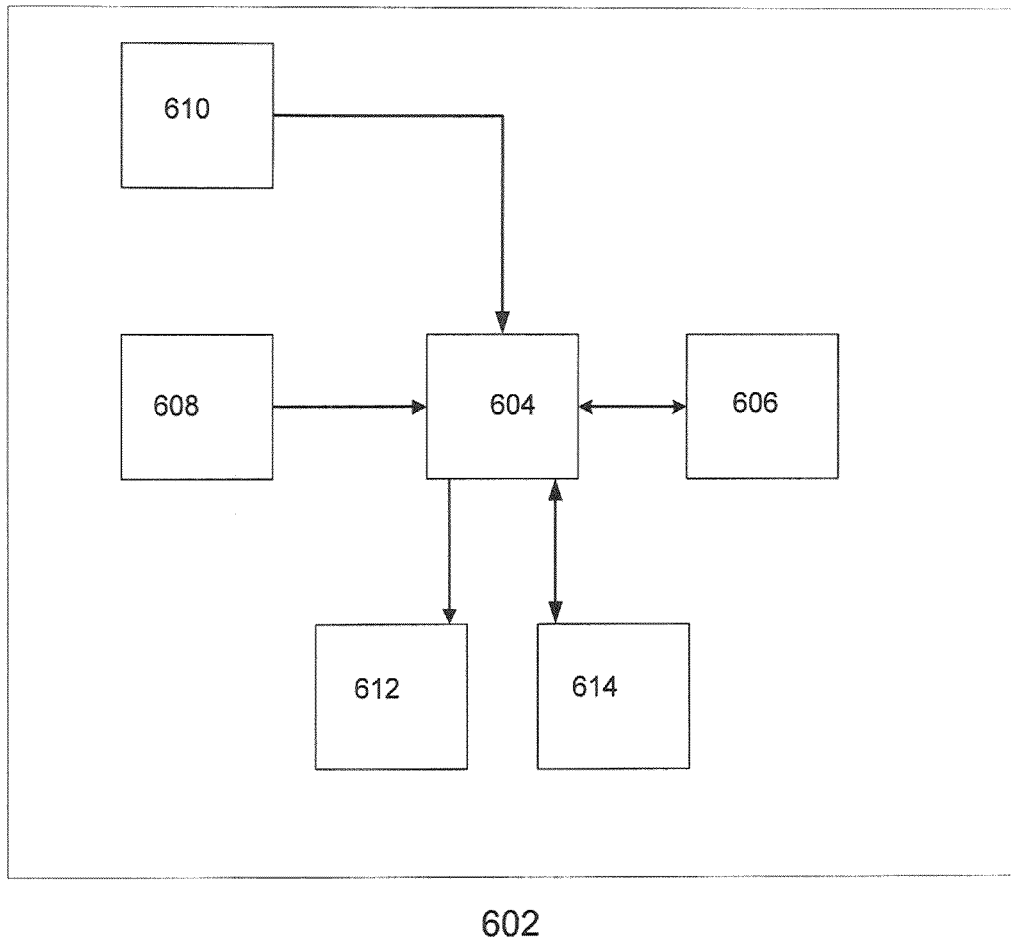
FIG. 6 is a block diagram of elements that may be present in a typical point of sale (POS) terminal that may be used with embodiments of the present invention.

FIG. 6 is a block diagram of elements that may be present in a typical point of sale (POS) terminal 602 that may be used with embodiments of the present invention. An exemplary POS terminal or data access device 602 may comprise a processor 604. It may also comprise a computer readable medium 606, keypad 608, a portable consumer device reader or other data access interface 610, an output device 612, and a network interface 614, all operatively coupled to processor 604. A housing may house one or more of these components.

Exemplary POS terminals 602 function to read or otherwise access data stored in or on portable consumer devices and can include RF (radio frequency) antennas, magnetic stripe readers, etc. that interact with a portable consumer device. Suitable output devices may include displays and audio output devices. Exemplary computer readable media may include one or more memory chips, disk drives, etc.

Figure 7:
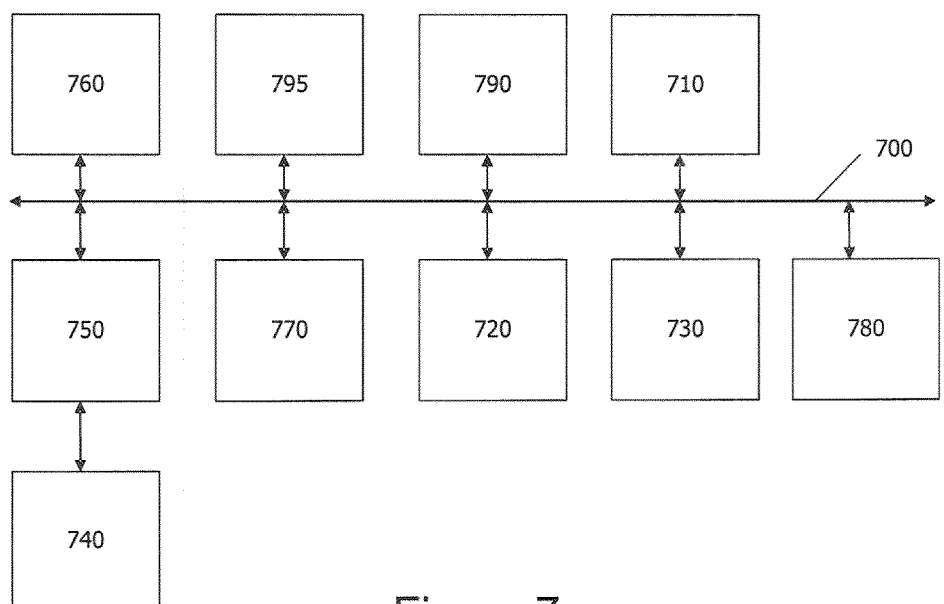
FIG. 7 is a block diagram of elements that may be present in a computer device or system configured to execute a method or process for using POS terminal identification data in accordance with some embodiments of the invention.

In some embodiments, the inventive method, process or operation for processing data that includes the globally unique POS terminal identifier may be wholly or partially implemented in the form of a set of instructions executed by a central processing unit (CPU) or microprocessor. As an example, FIG. 7 is a block diagram of elements that may be present in a computer device or system configured to execute a method or process for using POS terminal identification data in accordance with some embodiments of the invention. The subsystems shown in FIG. 7 are interconnected via a system bus 700. Additional subsystems such as a printer 710, a keyboard 720, a fixed disk 730, a monitor 740, which is coupled to a display adapter 750, and others are shown. Peripherals and input/output (I/O) devices, which couple to an I/O controller 760, can be connected to the computer system by any number of means known in the art, such as a serial port 770. For example, the serial port 770 or an external interface 780 can be used to connect the computer apparatus to a wide area network such as the Internet, a mouse input device, or a scanner. The interconnection via the system bus 700 allows a central processor 790 to communicate with each subsystem and to control the execution of instructions that may be stored in a system memory 795 or the fixed disk 730, as well as the exchange of information between subsystems. The system memory 795 and/or the fixed disk 730 may embody a computer readable medium.

In accordance with embodiments of the present invention, there have been described a system, apparatus, and methods for performing an electronic payment transaction. The transaction includes use of a point of sale (POS) terminal as part of the transaction. A unique number, code, alphanumeric character string, or other form of identification is assigned to each terminal manufacturer. This unique identifier may be generated in accordance with a numbering schema administered by a payment processor or other payment network entity. Each terminal manufacturer then assigns a unique identifier to each terminal they manufacture. The identifier assigned by the manufacturer may incorporate or be derived from the unique identifier assigned to each manufacturer. In the course of an electronic payment, other form of transaction, or other function or operation of the terminal, the POS terminal's unique global identifier is provided to a payment processor or other electronic payment network entity. This information, alone or in combination with portable consumer device data and transaction data, may be used to provide new services, content, and products to consumers or merchants.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. An apparatus for reducing fraud in payment transactions, comprising:
at least one processor configured to execute a set of instructions;
a memory coupled to the at least one processor for storing the set of instructions; and
the set of instructions stored in the memory, wherein when the instructions are executed by the at least one processor the apparatus operates to, at least:
receive, from a point of sale terminal manufacturer of a plurality of point of sale terminal manufacturers, a request for a point of sale terminal manufacturer identifier;
generate, by a payment processor, responsive to the request for a point of sale terminal manufacturer identifier, a point of sale terminal manufacturer identifier that is unique with respect to the plurality of point of sale terminal manufacturers;
provide, by the payment processor, the generated point of sale terminal manufacturer identifier;
access transaction data corresponding to a plurality of payment transactions;
process the transaction data to associate each of the payment transactions with a point of sale terminal used to conduct that payment transaction, wherein associating each of the payment transactions with a point of sale terminal further comprises processing the transaction data for each payment transaction to determine a point of sale terminal identifier for that payment transaction, the point of sale terminal identifier at least (i) uniquely identifying a point of sale terminal used to conduct the payment transaction regardless of a payment processing network used to process the payment transaction, (ii) being based at least in part on the point of sale terminal manufacturer identifier provided by the payment processor responsive to the request for a point of sale terminal manufacturer identifier by the point of sale terminal manufacturer and (iii) being independent of a network interface utilized by the point of sale terminal to access the payment processing network; and
process the transaction data to determine whether a specific point of sale terminal was used to conduct one or more fraudulent transactions based at least in part on the point of sale terminal identifier.

2. The apparatus of claim 1, wherein the apparatus operates to process the transaction data to determine whether a specific point of sale terminal was used to conduct one or more fraudulent transactions at least in part by authenticating the point of sale terminal based at least in part on the point of sale terminal identifier.

3. The apparatus of claim 1, wherein the apparatus further operates to process the transaction data to determine one or more characteristics of a point of sale terminal used to conduct one or more of the payment transactions, the one or more characteristics including the point of sale terminal model, location, number of transactions processed by the terminal, number of hours of operation of the terminal, or an in-service date of the terminal.

4. A method of reducing fraud in payment transactions, comprising:
receiving, from a point of sale terminal manufacturer of a plurality of point of sale terminal manufacturers, a request for a point of sale terminal manufacturer identifier;
generating, by a payment processor, responsive to the request for a point of sale terminal manufacturer identifier, a point of sale terminal manufacturer identifier that is unique with respect to the plurality of point of sale terminal manufacturers;
providing, by the payment processor, the generated point of sale terminal manufacturer identifier;
accessing, from an electronic data storage element, transaction data corresponding to a plurality of payment transactions;
processing the transaction data using an electronic data processing element to associate each of the payment transactions with a point of sale terminal used to conduct that payment transaction, wherein associating each of the payment transactions with a point of sale terminal further comprises processing the transaction data for each payment transaction to determine a point of sale terminal identifier for that payment transaction, the point of sale terminal identifier at least (i) uniquely identifying a point of sale terminal used to conduct the payment transaction regardless of a payment processing network used to process the payment transaction, (ii) being based at least in part on the point of sale terminal manufacturer identifier provided by the payment processor responsive to the request for a point of sale terminal manufacturer identifier by the point of sale terminal manufacturer and (iii) being independent of a network interface utilized by the point of sale terminal to access the payment processing network; and
processing the transaction data using the electronic data processing element to determine whether a specific point of sale terminal was used to conduct one or more fraudulent transactions based at least in part on the point of sale terminal identifier.

5. The method of claim 4, wherein processing the transaction data to determine whether a specific point of sale terminal was used to conduct one or more fraudulent transactions comprises authenticating the point of sale terminal based at least in part on the point of sale terminal identifier.

6. The method of claim 4, further comprising processing the transaction data to determine one or more characteristics of a point of sale terminal used to conduct one or more of the payment transactions, the one or more characteristics including the point of sale terminal model, location, number of transactions processed by the terminal, number of hours of operation of the terminal, or an in-service date of the terminal.

7. The method of claim 4, wherein the point of sale terminal identifier being based at least in part on the point of sale terminal manufacturer identifier provided by the payment processor comprises the point of sale terminal identifier incorporating the point of sale terminal manufacturer identifier provided by the payment processor with an identifier incorporation method distinct from concatenation of the point of sale terminal manufacturer identifier with another identifier.

8. The method of claim 7, further comprising:
generating the point of sale terminal identifier incorporating the point of sale terminal manufacturer identifier with the identifier incorporation method; and
providing the point of sale terminal identifier to the point of sale terminal.

9. The method of claim 4, wherein the payment processing network comprises a plurality of communication networks utilizing a plurality of communication media, the network interface utilized by the point of sale terminal to access the payment processing network is communicatively coupled to one of the plurality of communication networks and one of the plurality of communication media, and the point of sale terminal identifier uniquely identifies the point of sale terminal across the plurality of communication networks.

10. The method of claim 9, wherein:
the network interface is configured with a media access control identifier utilized by the one of the plurality of communication networks to control access to the one of the plurality of communication media; and
the point of sale terminal identifier is distinct from the media access control identifier.

11. The method of claim 4, further comprising receiving the point of sale terminal identifier responsive to an initialization process of the point of sale terminal.

12. The method of claim 11, wherein the initialization process of the point of sale terminal occurs in response to a request sent to the point of sale terminal from the payment processor.

13. The method of claim 4, further comprising:
sending a request to the point of sale terminal to provide the point of sale terminal identifier; and
receiving the point of sale terminal identifier responsive to the request.

14. The method of claim 4, further comprising sending an instruction to the point of sale terminal to replace a current non-unique point of sale terminal identifier with a new unique point of sale terminal identifier, the instruction including the new unique point of sale terminal identifier.

15. The method of claim 4, wherein the generated point of sale terminal manufacturer identifier is provided to the point of sale terminal manufacturer responsive to the responsive to the request for a point of sale terminal manufacturer identifier.

16. The method of claim 15, further comprising generating, by the point of sale terminal manufacturer, the point of sale terminal identifier based at least in part on the generated point of sale terminal manufacturer identifier provided responsive to the request for a point of sale terminal manufacturer identifier by the point of sale terminal manufacturer.

17. The method of claim 4, wherein associating each of the payment transactions with a point of sale terminal further comprises associating each of the payment transactions with a set of payment terminal attributes distinct from the point of sale terminal identifier and determining whether a specific point of sale terminal was used to conduct one or more fraudulent transactions is further based at least in part on the set of payment terminal attributes.

18. The method of claim 17, wherein the set of payment terminal attributes used to determine whether a specific point of sale terminal was used to conduct one or more fraudulent transactions includes at least one of: a payment terminal model, a payment terminal firmware version, a number of transactions processed by the payment terminal, and a number of continuous hours of operation of the payment terminal.

* * * * *